United States Patent [19]
Thompson

[11] 3,763,822
[45] Oct. 9, 1973

[54] FLUID DISPENSING SYSTEM FOR VEHICLE WASHING APPARATUS

[75] Inventor: William Harvey Thompson, Mentor, Ohio

[73] Assignee: Trans-Clean, Inc., Glenview, Ill.

[22] Filed: Oct. 15, 1971

[21] Appl. No.: 189,658

[52] U.S. Cl. .................... 118/73, 118/316, 134/45
[51] Int. Cl. ...................... G07f 13/00, B60s 3/04
[58] Field of Search .................. 118/2, 7, 72, 73, 118/316; 134/45, 123

[56] References Cited
UNITED STATES PATENTS

| | | | |
|---|---|---|---|
| 3,288,109 | 11/1966 | Smith et al. | 118/316 |
| 3,421,169 | 1/1969 | Hergonson | 134/45 |
| 3,587,807 | 6/1971 | Hickman | 134/45 |
| 3,595,250 | 7/1971 | Hurst | 134/45 |

Primary Examiner—Henry S. Jaudon
Attorney—Charles E. Quarton

[57] ABSTRACT

A detergent, rinse and wax application system for use in apparatus for washing the surfaces of a vehicle. The three functions of supplying a cleansing mixture, a wax mixture, and rinse fluid through a series of conduits connected to a movable vehicle washing apparatus are controlled by a manifold comprising only two control valves. In a second embodiment, the manifold is modified to supply cleansing fluid directly to a plurality of rotary brushes of the vehicle washing apparatus.

7 Claims, 3 Drawing Figures

Inventor.
William H. Thompson

FLUID DISPENSING SYSTEM FOR VEHICLE WASHING APPARATUS

The present invention relates to a vehicle washing apparatus, and in particular to a manifold system for supplying cleansing fluid, rinse fluid and wax to the surfaces of a vehicle to be washed. Control means are provided whereby two valve means perform the three functions of supplying cleansing fluid, rinse fluid and wax to the surfaces of the vehicle.

In present automatic vehicle washing apparatus, rotary brush means come into scrubbing contact with the vehicle surfaces as the vehicle passes through the washing apparatus, or as the apparatus passes over a stationary vehicle to be washed. In order to adequately clean the vehicle, a cleansing agent such as saponated liquid must be supplied to the vehicle surfaces as they are scrubbed by the brushes. The cleansing fluid also acts as a lubricant to prevent the brushes from scratching the painted finish on the vehicle.

In most vehicle washing apparatus, individual valve means are used to control the application of cleansing fluid and rinse fluid to the vehicle surfaces as they are contacted with the rotary brushes. Additional valve means are provided to control the application of wax to the vehicle, if desired by the driver. These valves are usually placed at a remote location relative to the washing apparatus itself, whereby conduits transmit the fluid from each valve to spray means adjacent the side and upper surfaces of the vehicle. In rollover type vehicle washing devices, which are designed to pass over a stationary vehicle to be washed, long, flexible hoses must be used to convey wash, rinse and wax solution to the spray means adjacent the vehicle, which results in a loss of pressure at the point of application to the vehicle in relation to the length of the hose utilized.

Therefore, a primary object of the present invention is to provide a control means for applying a cleansing, rinse and wax solution to the surfaces of a vehicle which utilizes only two valves to efficiently control three functions.

A further object of the present invention is to provide a control system for the application of rinse, wash and wax fluid to the surfaces of a vehicle, which is adapted to travel along the length of the vehicle as the vehicle is being washed, thereby eliminating the need for a plurality of lengthy conduits running from a remote station to the washing apparatus.

Still another object of the present invention is to provide a manifold for supplying fluid to the surfaces of a vehicle being washed by an automatic vehicle washing apparatus, which manifold comprises two valve means and two inductor means to control the three functions of selectively applying a washing solution, a rinse solution and a wax solution to the vehicle surfaces.

An object of an additional embodiment of the present invention is to provide a manifold of the type disclosed for use in a vehicle washing apparatus comprising rotary brushes for scrubbing the vehicle, whereby said manifold is adapted to apply a washing liquid solution directly to the point of contact between the rotary brushes and the vehicle surfaces.

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

Figure 1:
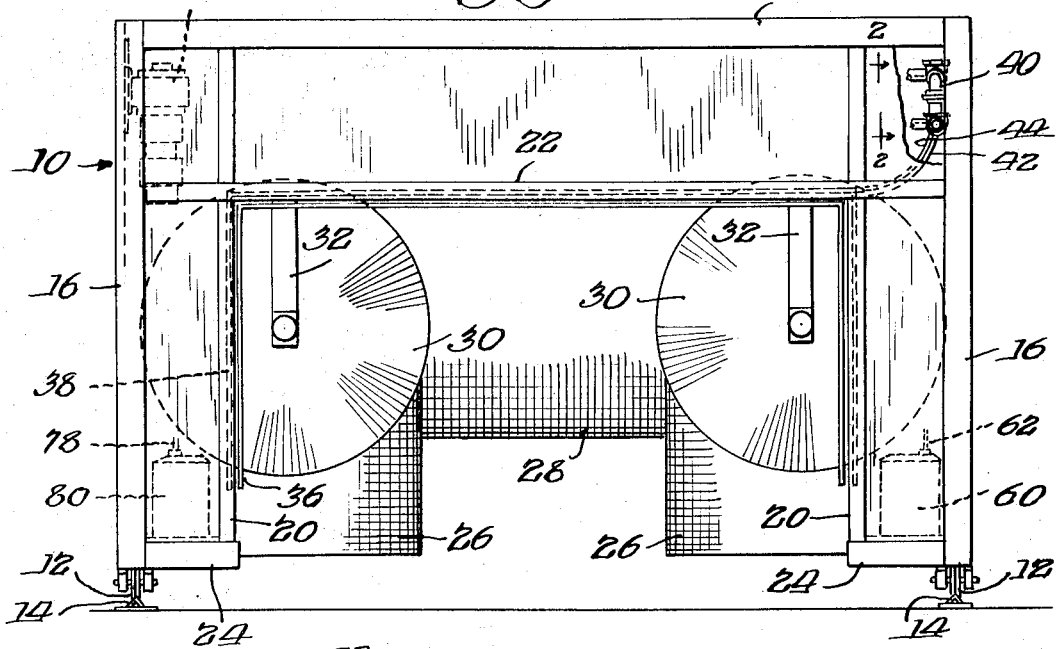
FIG. 1 is a front elevation view of a rollover vehicle washing apparatus using the improved fluid application means of the present invention.

Referring to the drawings, and in particular FIG. 1, a rollover carriage 10 is adapted to pass longitudinally over a vehicle to be washed (not shown). Wheels 12, rotatably affixed to carriage 10 are adapted to travel along tracks 14, which are disposed alongside a vehicle when the latter is properly placed in the washing station.

The carriage 10 comprises vertical structural members 16 and a horizontal structural member 18 disposed across vertical members 16. Additional structural members 20, 22 and 24 are provided to give strength to the gantry-like structure of carriage 10. Carriage 10 has articulated therefrom vertically mounted rotary side brush means 26 for scrubbing the lower vertical surfaces of the vehicle, and a horizontally disposed rotary brush 28 for scrubbing the upper horizontal surfaces of the vehicle such as hood, roof, and trunk deck. Additionally, horizontally mounted rotary brushes 30 are provided to scrub the upper vertical surfaces of the vehicle as carriage 10 travels along and over the vehicle to be washed. Each brush is mounted for rotation into and out of contact with the vehicle on a plurality of arms pivoted from carriage 10, as, for example, arms 32 supporting brushes 30. These arms are hydraulically actuated and controlled, and a hydraulic pump-motor unit 34 is mounted on carriage 10 to provide a source of hydraulic fluid under pressure for moving the brushes into and out of contact with the vehicle surfaces. A complete description of the vehicle washing apparatus disclosed in FIG. 1 may be found in my copending application for Letters Patent, Ser. No. 189,682, filed Oct. 15, 1971, entitled "VEHICLE WASHING APPARATUS."

Vertical structural member 20 and horizontal structural member 22 form a wash arch in the configuration of an inverted U which passes over and adjacent the vehicle surfaces to be scrubbed by brushes 26, 28 and 30. Connected to the wash arch of carriage 10 are a pair of hollow wash arch pipe members 36, 38 disposed in side-by-side relation and following the inverted U-shaped disposition of the washing arch. Each pipe member 36, 38 comprises spacially located spray nozzles (not shown) along the vertical and horizontal lengths thereof, which spray nozzles are in communication with the hollow interior of their respective pipe member. Each spray nozzle is directed toward the surface of the vehicle in the washing station, and it is apparent that any fluid flowing through pipes 36, 38 will eventually be deposited on the surface of the vehicle through the plurality of spray nozzles.

A manifold 40 is mounted on the frame of carriage 10 and provides the source of cleansing, rinse and wax fluid which is ultimately supplied to pipe members 36 and 38 through conduit means 42, 44. Manifold 40, which is shown in detail in FIG. 2, comprises an intake pipe 46 which is connected to a source of tap water supplying fluid at a rate of approximately 30 gallons per minute. Pipe 46 is attached by means of T-connector 48 to two conduit means or branches 50 and 52. First conduit means 50 comprises a first control valve 54 which, when open, permits the flow of fluid from pipe 46 through conduit 50, as will be explained. Detergent or cleansing agent inductor means 56 are provided in conduit 50 at the outlet of control valve 54. Inductor means 56 is a measuring device which automatically dispenses a proportioned amount of detergent or cleansing agent into the liquid flowing through conduit means 50. Inductor means 56 includes a coupling 58 which is connected by a flexible hose 62 to a vessel 60 (FIG. 1) which holds a substantial amount of cleansing agent or detergent. As is apparent in FIG. 1, the detergent supply vessel is mounted for movement with carriage 10.

Referring again to FIG. 2, a unidirectional flow valve 64 is provided in conduit 50 to prevent the reverse flow of fluid through the conduit. Additional pipe means 66 included in conduit 50 are connected to conduit member 42 through T-connection 68. As stated previously, conduit member 42 is connected to one of spray arch pipe members 36, 38.

Fluid entering manifold 40 through pipe 46 is also transmitted to conduit 52 by means of T-connector 48. A control valve 70 is disposed in conduit 52 to selectively permit the flow of fluid therethrough. A coupling member 72 connects conduit means 44 to conduit branch 52 at a point just beyond control valve 70. As will be explained, conduit 44 connects to one of U-shaped pipes 36, 38 of the washing arch to provide rinse fluid to the vehicle surfaces.

Wax inductor means 74 are disposed in conduit branch 52, and comprises a measuring device which automatically dispenses a proportioned amount of wax solution into the liquid flowing through conduit branch 52. A coupling member 76 is provided on inductor 74 for connecting to a flexible hose 78, which hose extends to a vessel 80 (FIG. 1) containing a substantial amount of wax solution. Vessel 80, as is apparent in FIG. 1, is mounted for movement with carriage 10.

Referring again to FIG. 2, a unidirectional flow valve 82 is provided in conduit means 52 to prevent the reverse flow of fluid through the conduit. The outlet of valve 82 is connected to one inlet port of T-connector 68, permitting fluid flowing through conduit means 52 to eventually be transmitted to pipe 42 and one of U-shaped pipes 36, 38.

Figure 2:
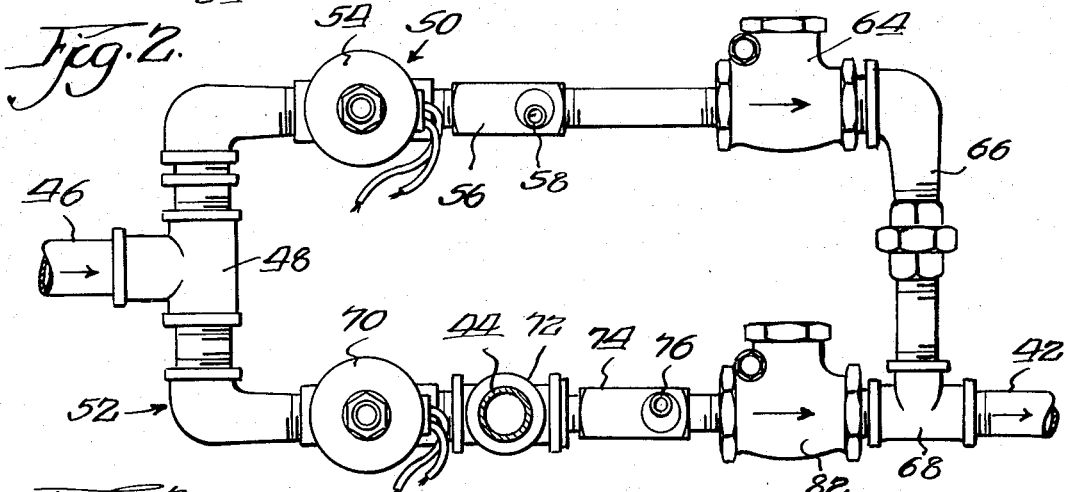
FIG. 2 is a front elevation view of one embodiment of the present invention taken along lines 2—2 in FIG. 1.
Figure 3:
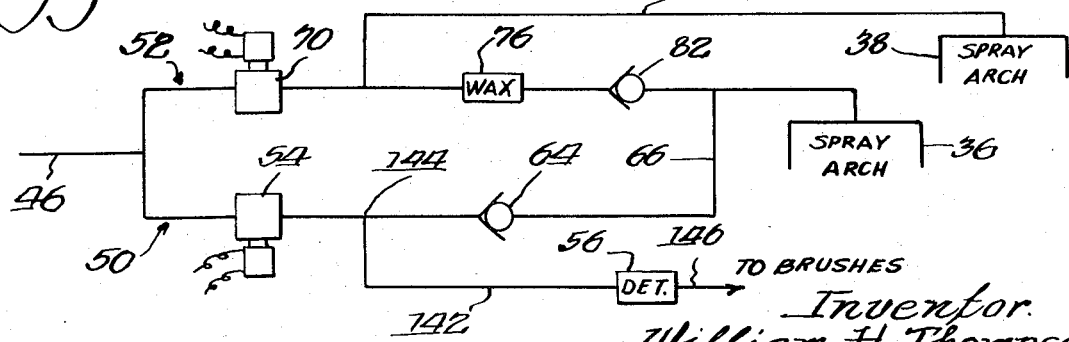
FIG. 3 is a schematic diagram of a second embodiment of the disclosed invention.

A second embodiment of the present invention is illustrated in FIG. 3, wherein like elements previously referred to in FIGS. 1 and 2 are identified with identical numerals. In this embodiment, means are provided to supply the mixture of fluid and cleansing agent directly to the brush surfaces, instead of through spray arch pipes 36 or 38. I have discovered that a more effective lubrication of the point of contact between the vehicle and the rotary brushes can be attained by applying the cleansing fluid directly to the brushes. Conduit 46 transmits tap water to conduit branches or means 50 and 52 as described in conjunction with the embodiment of FIG. 1. Conduit branch 52 is substantially the same as in the previously described manifold, however, conduit branch 50 has been modified by removing the cleansing agent or detergent inductor 56 and connecting it by means of pipe 142 to conduit branch 50 at a point 144 located downstream of control valve 54. The outlet of inductor means 56 is connected by pipe 146 to a point adjacent the outer surfaces of rotating brushes 26, 28 and 30. A portion of the fluid passing through conduit means 50 is transmitted through pipe 142 and inductor 56 to pipe 146 and the brush surfaces. At the same time, a portion of the fluid is transmitted through conduit 66 to spray arch pipe 36.

The operation of my invention will be described first with reference to the embodiment disclosed in FIGS. 1 and 2. As carriage 10 passes over a vehicle to be washed, brushes 26, 28 and 30 rotate and come into scrubbing contact with the vehicle. The control system which automatically operates the movement of carriage 10 and the pivotal and rotary movement of the brushes is more fully described in my co-pending application Ser. No. 189,682, filed Oct. 15, 1971, entitled "VEHICLE WASHING APPARATUS." The automatic control system which operates the washing apparatus opens control valve 54 during the first pass of carriage 10 over the vehicle, moving from front to rear. Control valve 70 remains shut, thereby transmitting the tap water in pipe 46 through conduit means 50. As the water passes through inductor 56, a cleansing agent or detergent is automatically mixed with the tap water in a measured amount to produce a saponated liquid solution. This saponated liquid passes through unidirectional flow valve 64, pipe means 66, T-connector 68 and into conduit 42 and spray arch pipe 36. The saponated fluid is dispensed through the spacially disposed spray nozzles in pipe 36, and applied to the vehicle surfaces in contact with the several brushes. Unidirectional flow valve 82 prevents the rearward flow of liquid through conduit means 52, preventing the passage of fluid through spray arch pipe 38 at this point in the operation of the vehicle washing apparatus.

When the carriage 10 reaches the rearward end of the vehicle, the vehicle has been thoroughly washed and scrubbed by the saponated liquid and rotary brushes. The carriage 10 then reverses its direction of movement and begins to travel forwardly over the vehicle. At this point, the control system closes valve 54 and opens valve 70, transmitting tap water in pipe 46 through conduit means 52. Conduit 44 carries a portion of the water to spray arch 38, which water rinses the vehicle as it issues from the various spray nozzles. The remaining water passes through inductor 74, where a wax solution is automatically mixed in a measured amount with the tap water in conduit means 52. The wax-water mixture then passes through unidirectional flow valve 82 to conduit 42 where it is applied to the surfaces of the vehicle in contact with the several brushes through spray arch 36 and the spray nozzles located therein. It will be appreciated that the rinse water and wax-water mixture are applied to the vehicle simultaneously through spray arches 36 and 38, respectively. Unidirectional flow valve 64 prevents the rearward flow of liquid through conduit means 50.

The operation of the embodiment disclosed in FIG. 3 is similar, except for the transmittal of fluid through conduit 50 during the rearward pass of carriage 10. As valve 54 is opened, a portion of the tap water in pipe 46 is transmitted to pipe 142 and inductor 56. A measured amount of detergent or cleansing agent is added to the water, and pipe 146 carries the saponated liquid mixture to each of the areas where the brushes contact the vehicle. The cleansing fluid is applied at the point where the brushes contact the vehicle, allowing the brushes to clean the vehicle surfaces. Further, the direction application of the cleansing fluid to the point of contact between brush and vehicle enables the fluid to more efficiently act as a lubricant and prevent the brushes from scratching the vehicle surfaces. Simultaneously, rinse water is applied to the surfaces of the vehicle through pipe 66 and spray arch 36.

While particular embodiments of the present invention have been shown and described, it is apparent that various changes and modifications may be made, and it is therefore intended in the following claims to cover all such modifications and changes as may fall within the true spirit and scope of this invention.

I claim:

1. A vehicle washing apparatus comprising rotary brushes for cleaning the surfaces of a vehicle:
   a supply of fluid;
   first and second inverted U-shaped pipes adapted to be disposed adjacent said surfaces of said vehicle;
   a plurality of spray nozzles disposed at spaced intervals along the length of said pipes;
   first conduit means including first valve means to selectively supply fluid from said supply to said first pipe;
   second conduit means including second valve means to selectively supply fluid from said supply to said first pipe;
   a supply of wax;
   first inductor means located in said second conduit means between said second valve means and said first pipe for introducing wax to said fluid in said second conduit means;
   third conduit means connected to said second conduit means to supply fluid to said second pipe whereby the flow of fluid through third conduit means is controlled by said second valve means;
   fourth conduit means having one end connected to said first conduit means between said first valve means and said first pipe and the other end disposed to deposit fluid passing through said fourth conduit directly onto said rotary brushes;
   a supply of cleansing agent; and
   means for introducing said cleansing agent to the fluid in said fourth conduit means whereby said fluid-cleansing agent mixture is deposited on said brushes.

2. In a vehicle washing apparatus for applying a cleansing fluid, a rinsing fluid and a wax to the surfaces of a vehicle, said spray assembly comprising:
   a source of washing fluid;
   a selectively operable cleansing valve coupled to said source of washing fluid to receive washing fluid therefrom;
   a selectively operable rinsing valve coupled to said source of washing fluid to receive washing fluid therefrom;
   cleanser-inductor means for receiving washing fluid from said cleansing valve and mixing cleanser with said washing fluid to form a cleanser-washing fluid mixture;
   wax-inductor means for receiving washing fluid from said rinsing valve and mixing wax with said washing fluid to form a wax-washing fluid mixture;
   spray means for directing fluid onto the surfaces of a vehicle being washed, said spray means independently receiving the cleanser-washing fluid mixture from said cleanser inductor means and the wax-washing fluid mixture from said wax-inductor means; and
   rinsing spray means for directing fluid onto the surfaces of the vehicle being washed, said rinsing spray means receiving washing fluid from said rinsing valve.

3. In the vehicle washing apparatus in accordance with claim 2 further including means for isolating said wax-inductor means from the cleanser-washing fluid mixture discharged from said cleanser-inductor means and for isolating said cleanser-inductor means from the wax-washing fluid mixture discharged from said wax-inductor means.

4. In the vehicle washing apparatus in accordance with claim 2 wherein said rinsing spray means is coupled to said rinsing valve at a location upstream from said wax-inductor means.

5. In the vehicle washing apparatus in accordance with claim 2 wherein said spray assembly is mounted on a movable carriage for travelling in a forward direction and a rearward direction along the vehicle being washed.

6. In the vehicle washing apparatus in accordance with claim 5 further including a source of cleanser mounted on said movable carriage and movable therewith for supplying cleanser to said cleanser-inductor means.

7. In the vehicle washing apparatus in accordance with claim 5 further including a source of wax mounted on said movable carriage and movable therewith for supplying wax to said wax-inductor means.

* * * * *